United States Patent [19]
Kakuta

[11] Patent Number: 4,864,825
[45] Date of Patent: Sep. 12, 1989

[54] SUCTION TYPE TURBO-SUPERCHARGER

[76] Inventor: Yoshiaki Kakuta, 1-8-1, Hamakawado, Kasukabe-Shi, Saitama-Ken, Japan

[21] Appl. No.: 219,247

[22] Filed: Jul. 15, 1988

[30] Foreign Application Priority Data

Jan. 30, 1988 [JP] Japan .................. 63-19758

[51] Int. Cl.$^4$ .......................... F01P 5/08; F02B 37/00
[52] U.S. Cl. .................. 60/598; 123/41.64; 417/89; 60/319
[58] Field of Search ............ 60/597, 598, 605.1, 60/614, 319; 417/89; 123/41.64

[56] References Cited

U.S. PATENT DOCUMENTS 2,845,774  8/1958  Bertin ........................ 60/614 X

FOREIGN PATENT DOCUMENTS 2133754  1/1973  Fed. Rep. of Germany ..... 60/605.1

Primary Examiner—Michael Koczo
Attorney, Agent, or Firm—Fleit, Jacobson, Cohn, Price, Holman & Stern

[57] ABSTRACT

A suction type turbo-supercharger (6) is driven by highly negative pressure suction air produced by a negative pressure generator (4) which accelerates the exhaust gas stream of an internal combustion engine (1), external air being drawn by the negative pressure into the suction turbine (61) of the turbo-supercharger (6) to rotate the supercharging turbine (62) coaxial and coupled with the suction turbine (61) to thereby supercharge the air fed into the combustion chamber of the engine. The air stream produced by the negative pressure drives the turbo-supercharger and may also be used to cool the engine, in which case the turbo-supercharger is driven by the air stream after cooling the engine.

19 Claims, 2 Drawing Sheets

SUCTION TYPE TURBO-SUPERCHARGER

RELATED CASES

This application relates to copending applications Ser. No. 07/195,834 filed May 19, 1988, Ser. No. 07/210,857 filed June 24, 1988, and Ser. No. 07/219,248 filed July 15, 1988, in the name of the same inventor.

1. Background of the Invention

This invention relates to a turbo-supercharger for use in an internal combustion engine and, more particularly, to a suction type turbo-supercharger driven by suction energy.

2. Description of the Prior Art

A conventional turbo-supercharger is of the type for driving an exhaust gas turbine directly utilizing exhaust energy i.e., the exhaust gas turbine is rotated by the exhaust gas stream exhausted from an engine to supercharge intake gas by a compressor coupled with the exhaust gas turbine.

Thus, the exhaust gas turbine must endure high temperature and high speed of the exhaust gas stream and therefore requires high technology in manufacture, and becomes expensive. If the temperature rises, the efficiency falls. Therefore, it is necessary to cool the turbo-supercharger itself with a complicated mechanism.

SUMMARY OF THE INVENTION

An object of this invention is to provide a suction type turbo-supercharger wherein the turbine of the supercharger is driven by a suction turbine operated by suction energy produced by accelerating the exhaust gas stream to generate a negative pressure, thereby forming a suction air stream.

Another object of this invention is to provide a suction type turbo-supercharger wherein the air drawn into the suction turbine is first used for forcibly air-cooling an engine.

The above objects of the invention are achieved by a suction type turbo-supercharger comprising a negative pressure generator for generating a negative pressure by an accelerator for accelerating an exhaust gas stream in an exhaust system of an internal combustion engine, and an air stream suction passage connected between the accelerator and a section turbine sucking an air stream by the negative pressure through the turbine to drive it.

The negative pressure generator further accelerates a high speed exhaust gas stream exhausted from the internal combustion engine to form a high negative pressure. The negative pressure generator is best provided downstream of the exhaust manifold, at the downstream end of a muffler, if a muffler is provided, i.e., at the farthest downstream position, and can thus maintain a high speed to form a strong negative pressure without resistance at the rear or downstream end.

The negative pressure generator can be constructed in one or more stages. In the case of a three-stage generator, first, second and third acceleration units are disposed in the flowing direction from the upstream side. Since the volume of the sucked atmospheric air introduced through the suction passage is added immediately after the respective acceleration units, the first to third acceleration units are provided so that volumes are sequentially increased from the first acceleration unit to the second acceleration unit, and from the second acceleration unit to the third acceleration unit. The volume to be increased is preferably set so that the internal pressure of the second acceleration unit added with the suction acceleration stream fed from the first air inlet to the internal pressure and the flow rate in the first acceleration unit becomes lower than that of the first acceleration unit.

In one embodiment of the invention, the suction passage is connected at the distal end to the negative pressure generator, at the other end to an air intake port, and intermediate thereof the air flows through an air-cooling section and a turbo-supercharger. In this invention, an arrangement wherein a turbo-supercharger is connected directly to an air intake port, and an arrangement wherein a turbo-supercharger is connected to the downstream side of an air jacket for cooling an engine are disclosed. In the latter case, the engine can be also forcibly air-cooled.

The basic difference between the supercharger of this invention and the conventional exhaust gas turbine supercharger resides in the fact that the conventional one drives the exhaust gas turbine by the exhaust gas flow while this invention drives the turbine by suction produced by the energy of the exhaust gas flow. Therefore, this invention can be defined as a suction gas turbine drive device.

BRIEF DESCRIPTION OF THE DRAWINGS

The invention will now be described in detail with reference to the accompanying drawing wherein.

DESCRIPTION OF THE PREFERRED EMBODIMENTS

Embodiment I

Figure 1:
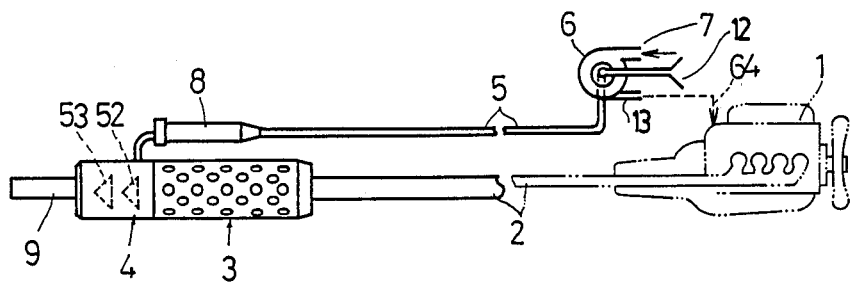
FIG. 1 is a schematic elevational view of a suction type turbo-supercharger according to the present invention.

FIG. 1 shows a turbo-supercharger according to this invention and related components. In FIG. 1, reference numeral 1 designates a gasoline engine, numeral 2 denotes an exhaust conduit, numeral 3 designates an exhaust muffler, numeral 4 indicates a negative pressure generator, numeral 5 designates a suction passage connected at one end to the generator 4, numeral 6 denotes a turbo-supercharger connected at its suction passage 5 to a suction turbine, numeral 7 designates a suction air intake port, numeral 8 indicates a negative pressure muffler interposed in the suction passage 5, and numeral 9 designates a tail, or exhaust outlet tube.

Negative pressure generator 4 is integrally connected with the rear end of exhaust muffler 3, which is open at its front portion by a connection port 31 to be connected with the exhaust conduit 2, and which has a main passage 32 of smaller-diameter than that of the connection port 31 at the center in such a manner that a tapered wall 34 is formed from the connection port 31 to the inlet throttle 33 of the main passage 32 so that it is inclined in the direction. The main passage 32 is formed of a central cylindrical member 36 open on the peripheral surface by a number of vent holes 35 and surrounded in spaced relation from the outer periphery by a porous cylinder 39 and a nonporous cylinder 40 in turn surrounding cylinder 39 to form double bypass passages 37 and 38. Numeral 41 designates vent holes in the wall of porous cylinder 39, numeral 42 denotes a main passage outlet, numeral 43 designates a bypass passage outlet, numeral 44 indicates an acceleration commutator provided at the rear end of main passage 32 for an exhaust gas stream, numeral 45 designates its acceleration flow outlet, and numeral 46 denotes an outermost cover having a number of ports 47.

The negative pressure generator 4 is connected to the downstream end of muffler 3. Thus, the exhaust gas stream is further accelerated in multiple stages by the tapered conduit 51 and first and second acceleration units 52, 53 to form a strong negative pressure. The air stream is sucked through the suction conduit 5 connected to a casing 56 to communicate with first and second air inlets 54, 55 provided directly after both acceleration units 52, 53 by the negative pressure thus formed. The acceleration units may be single or in two or more stages.

The volume $V_1$ of the first acceleration unit is set to obtain a primary acceleration stream by throttling the exhaust stream to the minimum in the tapered conduit 51. The volume $V_2$ of the second acceleration unit 53 of this embodiment is so increased as to become $V_2 = AV_1$ (A=2). This coefficient A may take other numerical values as well. The inner diameter of the tail tube 9 is larger than that of the second acceleration unit 53. The first and second air inlets 54 and 55 are preferably provided with a forward angle $\theta$ which is larger than 0 and less than 90°, and more preferably 10 to 45 degrees, with respect to the central axis of muffler 3.

Figure 3:
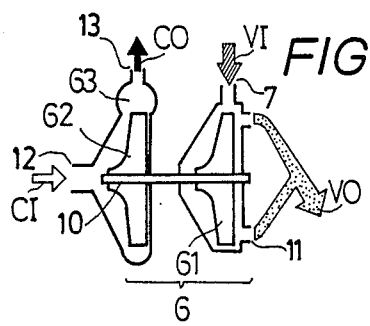
FIG. 3 is a schematic view of the operation of the turbo according to the invention.

The turbo-supercharger 6 is exemplified to be of a centrifugal type having a suction turbine 61 (see FIG. 3) and a supercharging turbine, i.e., an impeller 62, coupled to turbine 61 by shaft 10, where VI is an air stream drawn into the suction turbine 61 through inlet 7, VO is the air stream flowing out to suction passage 5 through outlet 11, CI is an air stream drawn into the impeller 62 through inlet 12, and CO is a stream supercharged by impeller 62 and flowing through a diffuser 63 and outlet 13. Numeral 64 denotes a conduit for feeding supercharged air under pressure to a carburetor or an injector of an engine 1 from the supercharger.

Operation

In the construction described above, when the gasoline engine 1 is started, exhaust gas is fed through the exhaust conduit 2, silenced through the exhaust muffler 3, then fed into the negative pressure generator 4, accelerated by 2-stage acceleration units 52, 53, and exhausted into the atmosphere from the tail tube 9. In this case, negative pressure is generated at the outer periphery of the acceleration units. As a result, a gas flow induced by the negative pressure generator 4 is generated in the suction passage 5. Thus, turbine 61 which communicates with the passage 5 is rotated by the air stream drawn in through the air inlet 7 so that the rotating speed is accelerated in response to an increase of the negative pressure, i.e., the increase of the operating load of the engine 1. Simultaneously, air is drawn through inlet 12 into the supercharger by impeller 62 rotation of the impeller 62 connected by rotational shaft 10 to the suction turbine 61, compressed, and fed through outlet 13 and conduit 64 under pressure to a carburetor or an injector.

According to this invention as described above, the negative pressure is not merely generated by the exhaust gas to drive the turbine, but is strengthened in vacuum sucking action without resistance at the downstream side. Therefore, stronger vacuum energy can be realized to solve the problem of incomplete utilization of energy in driven turbine type superchargers.

Embodiment II

Figure 4:
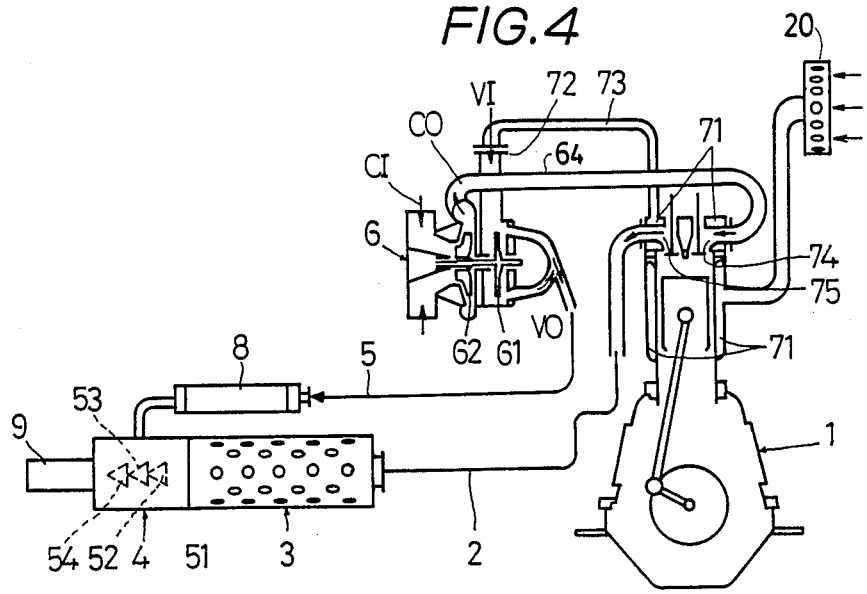
FIG. 4 is a view similar to FIG. 1 of a second embodiment of the invention.

FIG. 4 shows another embodiment of the turbo-supercharger in combination with cooling means of an engine, where the same reference numerals as those in FIG. 1 denote the same or equivalent components, and the detailed description thereof will be omitted.

In this embodiment, an air jacket 71 is provided instead of a jacket for water-cooling around the heat generating portion of the engine 1, and an air passage, or connector pipe, 73 is provided between the air jacket 71 and the inlet port 72 of the suction turbine 61. Numeral 74 designates the engine inlet value port, and numeral 75 denotes exhaust value port. The air intake for the engine is shown at 20. The negative pressure generator 4 in this embodiment is constructed the same as that in the first embodiment except that it has three stages including additional stage 54. The configuration of the negative pressure generator of this embodiment is the same as that in the first embodiment, and the increasing rate of the volume of the acceleration units is doubled.

Operation

In the construction described above, the operation whereby air is drawn through the air inlet of turbine 61 and flows to the negative pressure generator 4 through conduit 5 by the operation of the engine 1 is the same as that in the first embodiment, but prior thereto the air additionally flows through cooling jacked 71, to cool the engine thereby picking up heat to further drive the turbo-supercharger 6, which is different from the first embodiment.

Thus, the air stream which flows into suction turbine 61 has a higher temperature than the atmosphere, but is much lower than that of the exhaust gas to scarcely effect a thermal influence on the suction turbine 61. Since the air density is high, its charging efficiency is not decreased. Air cooling an engine by flowing atmosphere air through a cooling jacket by forming a high negative pressure utilizing exhaust gas energy is already disclosed. This invention may be combined with the forced air cooling type to operate as described above in this invention, and the functions and performance of the air cooling side and turbo-side are not lost.

In the case of a four-cycle engine having 750 cc of displacement for a motorcycle, a preferable result could be obtained in an arrangement wherein the diameter of the first acceleration unit was 10 to 40 mm, and the length of the tail tube was 50 to 300 mm. In three-stage acceleration units, the flow velocity in connector pipe 73 and valve parts 74, to exceed a sonic velocity.

Modified Embodiment of Exhaust Muffler

Figure 2:
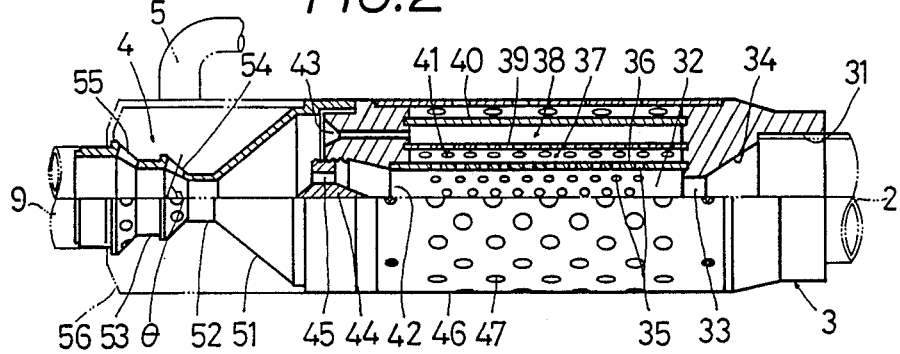
FIG. 2 is an enlarged cross-sectional view of the negative pressure generator connected to a muffler as shown in FIG. 1.
Figure 5:
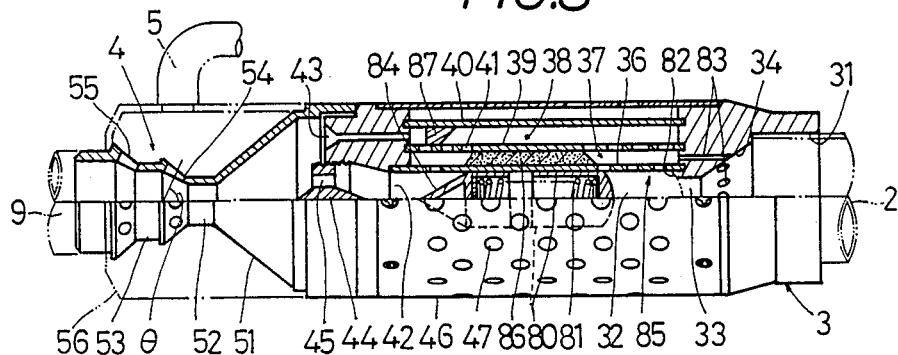
FIG. 5 is an enlarged cross-sectional view of a modified embodiment of the muffler in accordance with the invention.

FIG. 5 shows an embodiment wherein a low speed torque intensifying mechanism is associated in muffler 3 combined with a negative pressure generator 4. A movable valve body 80 is telescopically inserted into the main passage 32 of the muffler 3, resiliently contacted by a spring 81 with the main passage inlet 82, and a connection port 31 is always connected with a bypass passage 37 through an idle passage 83. Numeral 84 designates a communication cover, numeral 85 denotes a regulating zone opened or closed by the movable valve body 80, numeral 86 depicts an adiabatic layer, numeral 87 indicates an annular wall, and numeral 88 designates a pressure bearing surface. The arrangement is otherwise the same as that in FIG. 2.

According to this arrangement, when the exhaust energy is small, the valve body 80 closes the main passage 32. Thus, the exhaust gas is fed through the idle passage 83 which becomes a resistance. Therefore, the torque of the engine 1 is increased against the resistance. Thus, when the rotation of the engine is raised to enhance the energy, the valve body 80 is moved backward, or off of inlet 82 to reduce the flow resistance and thereby becomes similar to the ordinary muffler. Consequently, large torque is not produced at the time of idling. The turbo performance is not expected at the time of low speed rotation, and this point is supplemented by the aforementioned arrangement.

The negative pressure muffler 8 provided between the negative pressure generator 4 and the suction passage 5 prevents the exhaust gas from being reversely fed and the pressure from momentarily pulsating at the time of deceleration, with a check valve to be contained therein.

In a vehicle, or aircraft having the engine supercharged by this suction type turbo-supercharger exhaust energy at high torque is generated as the load increases in a practical operation state. Thus, the vacuum acting on the suction turbine is much increased at the time of practical operation as compared with idling or no-load acceleration. Further, since the suction turbine 61 and the impeller 72 are not effected at all by the temperature of the exhaust gas, heat resistance in the suction turbine and the impeller is not a problem, and the operating efficiency and the charging efficiency are largely improved due to utilization of low temperature air as compared with the conventional type.

I claim:

1. A suction type turbo-supercharger for an internal combustion engine, the engine having an exhaust system comprising:
    an air cooled jacket means on the engine for cooling the engine;
    a turbo-supercharger having a gas driven turbine and rotary compressor operatively connected so that said turbine drives said compressor, and inlet port means and outlet port means for said driven turbine, said air cooled jacket being connected to said turbine inlet port;
    a negative pressure generator in the exhaust system through which exhaust gas from the engine flows comprising accelerator means for accelerating the exhaust gas flowing through said generator and generating negative pressure; and
    air flow conduit means connecting said negative pressure generator with said gas driven turbine so that said negative pressure draws air through said turbine to drive said turbine.

2. A suction type turbo-generator as claimed in claim 1 wherein:
    a muffler is provided in the exhaust system; and
    said negative pressure generator is disposed downstream of said muffler.

3. A suction type turbo-generator as claimed in claim 2 wherein:
    said muffler has an outlet end; and
    said negative pressure generator is connected to said outlet end of said muffler.

4. A suction type turbo-supercharger for an internal combustion engine, the engine having intake means and exhaust port means comprising:
    an exhaust system pipe having one end connected to the exhaust port means and the other end open to the atmosphere for conducting an exhaust gas stream from the engine;
    a turbo-supercharger having a gas driven turbine and a compressor operatively connected to said turbine to be driven thereby for compressing and supercharging gas fed to the engine intake means;
    inlet means and outlet means for said turbine;
    exhaust gas acceleration means in the exhaust system pipe comprising a reducing section for decreasing the cross-sectional area of the exhaust gas stream, and at least one acceleration section downstream of said reducing section for increasing the flow velocity of the exhaust gas stream to a high velocity and for producing a high energy negative pressure; and
    a suction conduit having an outlet end operatively connected to said acceleration means and said negative pressure produced thereby, and an inlet operatively connected to said turbine outlet means so that said negative pressure draws air through said turbine inlet means to rotate said turbine.

5. A suction type turbo-generator as claimed in claim 4 wherein:
    said acceleration means comprises a plurality of said acceleration sections disposed in series along the direction of flow of the exhaust gas stream.

6. A suction type turbo-generator as claimed in claim 4 wherein:
    said acceleration means further comprises a casing around and in spaced relation to said at least one acceleration section defining a closed space between said at least one acceleration section and said casing; and
    an inlet opening in said casing connected to said suction conduit outlet.

7. A suction type turbo-generator as claimed in claim 4 wherein:
    a muffler is operatively connected to said exhaust system pipe; and
    said acceleration means is disposed in series downstream of said muffler.

8. A suction type turbo-generator as claimed in claim 4 wherein:
    said reducing section comprise a hollow substantially frustoconically shaped member having the smaller cross-sectional end thereof downstream of the larger cross-sectional end thereof; and
    said at least one acceleration section comprises a tubular member extending downstream from said smaller cross-sectional end of said reducing section and having a downstream outlet end, and a second hollow substantially frustoconically shaped member having the smaller cross-sectional end thereof connected to said outlet end of said tubular member.

9. A suction type turbo-generator as claimed in claim 8 wherein:
    said at least one acceleration section further comprises a plurality of holes through said second hollow substantially frustoconically shaped member for communicating the interior thereof with said suction conduit outlet.

10. A suction type turbo-generator as claimed in claim 9 wherein:
said acceleration means further comprises a casing around and in spaced relation to said at least one acceleration section defining a closed space between said at least one acceleration section and said casing; and
an inlet opening in said casing connected to said suction conduit outlet.

11. A suction type turbo-generator as claimed in claim 9 wherein:
a second acceleration section is provided comprising a second substantially tubular member extending downstream from the larger cross-sectional end of said second hollow substantially frustoconically shaped member, a third hollow substantially frustoconically shaped member having the smaller cross-sectional end thereof extending from the downstream end of said second substantially tubular member, and a plurality of holes through said third hollow substantially frustoconically shaped member for communicating the interior thereof with said suction conduit outlet.

12. A suction type turbo-generator as claimed in claim 11 wherein:
said acceleration means further comprises a casing around and in spaced relation to said at least one acceleration section defining a closed space between said at least one acceleration section and said casing; and
an inlet opening in said casing connected to said suction conduit outlet.

13. A suction type turbo-generator as claimed in claim 16 wherein:
a muffler is operatively connected to said exhaust system pipe; and
said acceleration means is disposed in series downstream of said muffler.

14. A suction type turbo-generator as claimed in claim 8 wherein:
a muffler is operatively connected to said exhaust system pipe; and
said acceleration means is disposed in series downstream of said muffler.

15. A suction type turbo-generator as claimed in claim 9 wherein:
a muffler is operatively connected to said exhaust system pipe; and
said acceleration means is disposed in series downstream of said muffler.

16. A suction type turbo-generator as claimed in claim 11 wherein:
a muffler is operatively connected to said exhaust system pipe; and
said acceleration means is disposed in series downstream of said muffler.

17. A suction type turbo-generator as claimed in claim 14 wherein:
said acceleration means further comprises a casing around and in spaced relation to said at least one acceleration section defining a closed space between said at least one acceleration section and said casing; and
an inlet opening in said casing connected to said suction conduit outlet.

18. A suction type turbo-generator as claimed in claim 17 wherein:
the larger cross-sectional end of said reducing section hollow substantially frustoconically shaped member is connected to the downstream end of said muffler; and
said casing has one end connected to said larger cross-sectional end of said reducing section hollow substantially frustoconically shaped member.

19. A suction type turbo-generator as claimed in claim 7 wherein said muffler comprises:
an inlet end connected in series with said exhaust system pipe;
an inner tubular element having an upstream end connected to said muffler inlet end;
a plurality of holes through said inner tubular element;
a second tubular element surrounding said inner tubular element in spaced relation thereto and having an upstream end connected to said muffler inlet end;
a piston valve member slidably mounted in said inner tubular element;
spring means for resiliently urging said piston valve member into engagement with said muffler inlet end for closing said upstream end of said inner tubular member;
a plurality of restricting holes through said muffler inlet end having downstream ends communicating with the space between said inner tubular element and said second tubular element;
a plurality of holes through said second tubular element; and
at least one outer tubular element surrounding said second tubular element in spaced relation thereto;
so that at a predetermined lower pressure in said exhaust system pipe said spring means moves said piston valve member to close said inner tubular element and exhaust gas flows through said restricting holes and said holes in said second tubular element.

* * * * *